Figure 1:
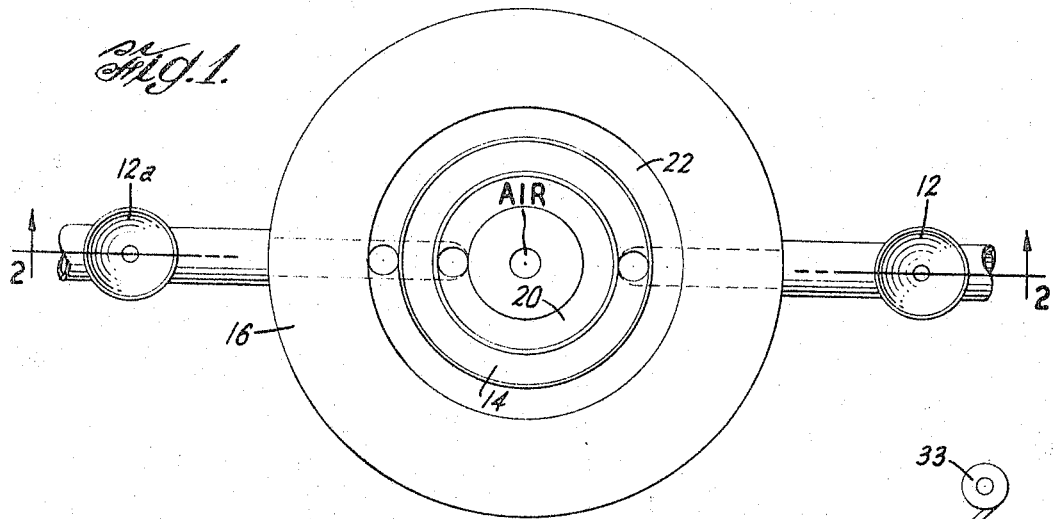

INVENTOR.
WILLIAM SACKS
ATTORNEY

United States Patent Office 3,322,870
Patented May 30, 1967

---

3,322,870
METHOD OF PRODUCING CLEAR, CRYSTALLINE, HIGH-GLOSS THERMOPLASTIC FILM
William Sacks, Gillette, N.J., assignor to Union Carbide Corporation, a corporation of New York
Filed Apr. 6, 1965, Ser. No. 445,931
5 Claims. (Cl. 264—95)

This invention is a continuation-in-part of a copending application, Ser. No. 200,080, filed on June 5, 1962, and now abandoned.

This invention relates to crystalline thermoplasic films and methods of producing the same. More specifically, it relates to crystalline thermoplastic film having improved optical properties, i.e., greater transparency, and methods by which such crystalline thermoplastic films can be produced.

It is well known that crystalline thermoplastic materials although transparent in their molten state, nevertheless normally become increasingly opaque and hazy upon cooling. While attempts have been made to eliminate the haze, nevertheless in present commercially available crystalline thermoplastic film, haze is still a problem and the films often lack the high gloss which is very desirable in films that are to be used in packaging application. In many such applications an optically clear, high-gloss film is required, not only because of appearance, but also in order to permit a prospective purchaser to have a clear view of the contents of the package. A serious drawback in commercial utility of crystalline thermoplastic films, and particularly polyethylene, in packaging applications is the inability to properly satisfy this high clarity requirement. When, for example, polyethylene film having a density of about 0.96 is formed by conventional blown tube extrusion methods, a haze value (as measured by methods described in ASTM D-672-45T) as high as 65% or more is generally encountered.

Accordingly, it is an object of this invention to provide a method by which such normally high haze crystallizable films can be formed as clear, crystalline, high-gloss films.

The present invention provides a method of producing clear, crystalline, high-gloss, self-supporting thermoplastic films which comprises continuously extruding at least three molten thermoplastics through a multiple orifice film-forming extrusion die in the form of seamless tubing, continuously withdrawing the tubing from the point of extrusion, flattening the tubing at a predetermined distance from the point of extrusion, maintaining a substantially constant continuous isolated bubble of a gaseous medium in the section of the tubing between the point of extrusion and the point of flattening; and which method further comprises extruding as one of said thermoplastics a molten crystallizable thermoplastic material through the center orifice of the die and simultaneously therewith extruding smooth surface-forming thermoplastic films through the innermost and outermost orifices of the die; intimately contacting both surfaces of the crystallizable thermoplastic material with the smooth surface-forming films without adhering thereto immediately upon egress of the films from the die and simultaneously cooling the composite films while in this contacting relationship; maintaining sufficient pressure within the bubble while the composite films are cooling in order to maintain the composite films in the contacting relationship, and thereafter, separating the nonadhering smooth surface-forming thermoplastic films from both surfaces of the crystallizable thermoplastic film thereby recovering a clear, crystalline, high-gloss, self-supporting thermoplastic film.

Figure 2:
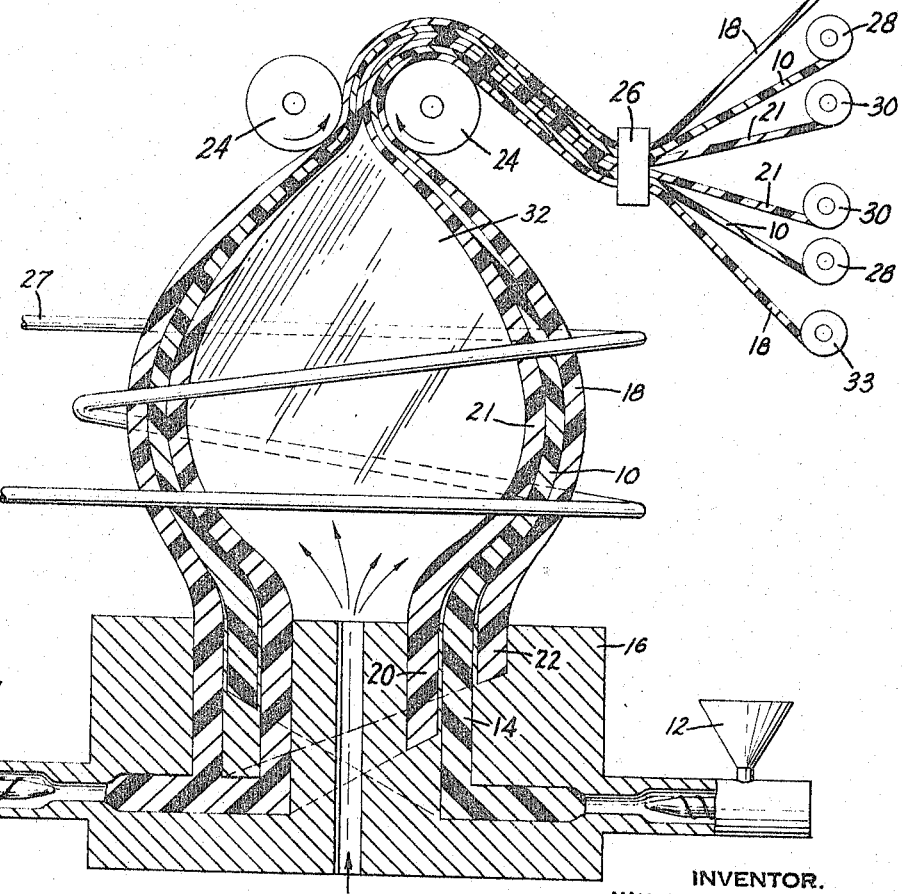

In the drawing:
FIG. 1 is a plan view of a triple orifice die employed in the practice of the present invention.
FIG. 2 is an elevational view in section taken along line 2—2 of FIG. 1 illustrating one mode of operation contemplated by the present invention.

Referring now to the drawing, there is shown in FIG. 1 a circular triple-orifice die 16 having an innermost orifice 20, a center orifice 14 and an outermost orifice 22. Situated on opposite sides of the die 16 and in communication therewith are extruders 12 and 12a.

As shown in FIG. 2, squeeze rollers 24 are positioned at a predetermined distance above the die 16 and stationed between the die 16 and the rollers 24 is a cooling ring 27. Similarly at a predetermined distance from the rollers 24 is a conventional slitter 26. Proximate the slitter 26 are a series of take-up rollers 28, 30 and 33.

When the apparatus is in operation, tubular crystallizable polyethylene film 10, for example, is extruded by extruder 12 through the center orifice 14 and concurrently and simultaneously therewith tubular polystyrene films 18 and 21 are extruded from extruder 12a through the innermost and outermost orifices 20 and 22, respectively (FIG. 1). Immediately upon egress of the films 10, 18 and 21 from the die 16, both surfaces of the polyethylene 10 are intimately contacted with the smooth surface-forming tubular polystyrene films 18 and 21. The composite films 10, 18 and 21 are simultaneously cooled while in this contacting relationship. The contacting relationship is maintained by establishing a bubble of air within the space 32 formed by the multiwall tubing which also serves to distend the tubing to the desired diameter. The air pressure maintained within the bubble is not critical but should be greater than atmospheric pressure to insure intimate contact of the films 10, 18 and 21. The cooling of the composite films is accomplished by passing the films through a cooling ring 27. The composite films continue upwardly and are then flattened upon passing through squeeze rollers 24 which serve simply to maintain the air bubble in space 32 and do not act as impression rollers. The flattened multiple layer composite of the films is slit at the edges by the slitter 26, and thereupon the polystyrene films 18 and 21 are stripped off the interposed polyethylene film 10. Hence, clear crystalline, high-gloss, self-supporting polyethylene film 10 is recovered on the take-up roller 28 while the polystyrene films 21 and 18 are recovered on the take-up rollers 30 and 33, respectively. The polystyrene films can be reprocessed if desired.

Crystalline thermoplastic materials become increasingly opaque and hazy as their cooling time is increased. However, in the present invention even though the cooling time of the polyethylene film is substantially increased due to being interposed between the polystyrene layers, nevertheless, by intimately contacting both surfaces of the polyethylene film as hereinabove described with smooth-walled thermoplastic materials especially selected because of their nonadherence to the polyethylene film, upon extended cooling the polyethylene film is unexpectedly clear, crystalline, and glossy.

It is considered important in this invention that the non-adhering thermoplastic materials employed have smooth walls thereby creating, in essence, a smooth-walled cavity within which the crystallizable thermoplastic film is allowed to cool. It has been found in this invention, that haze and low gloss especially in thin crystalline films are substantially attributable to surface roughness and irregularities in the film. Thus, by allowing the crystallizable film to cool in intimate contact with the smooth-walled cavity provided by the non-adhering smooth surface-forming thermoplastic films which encompass said crystallizable film during the cooling process, crystalline thermoplastic film exhibiting excellent clarity and high gloss are obtainable even though the cooling time is extended and would thereby normally be expected to provide extremely hazy film.

The method of the present invention can also be employed in a flat film slot extruder as well as by a tubular film extruder. If desired, a multilayer film having more than three layers can be formed, the only requirement being that a film or different films of smooth surface-forming material, for example, polystyrene, intimately contacts both sides of the film of crystalline polymeric material, for example, polyethylene.

Thermoplastic materials found suitable as the covering layers for both surfaces of the crystallizable thermoplastic film in accordance with the invention are those which inherently form smooth surfaces and do not form a chemical bond with the crystallizable film when the films are in intimate contact as previously described. It is essential in the practice of the invention that the thermoplastic films to be used to cover the surfaces of the crystallizable film do not adhere upon cooling, otherwise the composite will not be separable into individual films. Exemplary of such non-adhering smooth surface-forming thermoplastic materials other than polystyrene which have been found suitable in the practice of the invention are cellulose acetate, polymethylacrylate, polyethylene terephthalate, and the like. However, equally suitable materials can be readily ascertained by one familiar with the art through simple empirical tests.

The clarity and glossiness of many crystalline polymeric materials can be improved by this invention. Films formed of crystalline polymeric materials, such as low-density polyethylene (that is, density of 0.914 to 0.928), high-density polyethylene (that is, density greater than about 0.940 and up to about 0.970), polyisobutylene, polyurethanes, polyesters (such as polyethylene terephthalate), polyamides, etc., can all be satisfactorily treated.

The following non-limiting specific example serves to more fully demonstrate the novel features of the invention.

A circular tube die 3 inches in diameter and having three concentric orifices was connected to a polyethylene extruder and a polystyrene extruder. Molten polyethylene was extruded through the center orifice of the die while molten polystyrene was extruded through both the innermost and outermost orifices of the die. The die temperature was maintained at 205° C.; the polyethylene was extruded at about 185° C. and the polystyrene was extruded at about 205° C. The multiple layer tubing was extruded by the blown tube method disclosed in Fuller, U.S. 2,461,975. The multiple layer tubing having a flat width of 10 inches consisted of inner and outer polystyrene layers 1 mil (0.001 inch) thick and a middle or center layer of low density (0.92) polyethylene film 2 mils (0.002 inch) thick. The flat multiple layer tubing was slit at the edges forming two multilayer sheets from which the polyethylene film was separated. The polyethylene film produced in this manner was exceptionally glossy and had a haze value of 5.9%. In contrast, extruded films made from the same polyethylene polymer under similar conditions but without contact with conjointly extruded polystyrene had a haze value of 14.5%. Haze values were determined in accordance with the methods described in (ASTM D-672-45T).

What is claimed is:

1. A method of producing clear, crystalline, high-gloss, self-supporting thermoplastic film which comprises continuously extruding molten thermoplastics through a multiple orifice film-forming extrusion die in the form of seamless tubing, continuously withdrawing the tubing from the point of extrusion, flattening the tubing at a predetermined distance from the point of extrusion, maintaining a substantially constant continuous isolated bubble of a gaseous medium in the section of the tubing between the point of extrusion and the point of flattening, and which method further comprises:
   (a) extruding as one of said thermoplastics a molten crystallizable thermoplastic material through the center orifice of said die;
   (b) extruding simultaneously with said crystallizable thermoplastic material smooth surface-forming thermoplastic films through the innermost and outermost orifices of said die;
   (c) intimately contacting both surfaces of said crystallizable thermoplastic film without said smooth surface-forming films adhering thereto immediately upon egress of said films from said die and simultaneously cooling the composite films while in said contacting relationship;
   (d) maintaining sufficient pressure within said bubble while said composite films are cooling to maintain said composite films in said contacting relationship, and
   (e) thereafter slitting and stripping off the non-adhering smooth surface-forming thermoplastic films from both surfaces of the crystallizable thermoplastic film thereby recovering a clear, crystalline, high-gloss, self-supporting thermoplastic film.

2. The method of claim 1 wherein the pressure maintained within said bubble is greater than atmospheric pressure.

3. The method of claim 1 wherein the smooth surface-forming thermoplastic material is one which does not form a chemical bond with said crystallizable thermoplastic film when said composite films are in said contacting relationship.

4. The method of claim 3 wherein the smooth surface-forming polymeric material is a material selected from the group consisting of polystyrene, cellulose acetate, polymethylacrylate, and polyethylene terephthalate.

5. A method of producing clear crystalline high-gloss self-supporting polyethylene film which comprises continuously extruding molten thermoplastics through a triple orifice circular tube-forming die in a vertical upward direction in a form of seamless tubing, continuously withdrawing the tubing from the point of extrusion, flattening the tubing at a predetermined distance above the point of extrusion, maintaining a substantially constant continuous isolated bubble of a gaseous medium in the section of the tubing extending upwardly between the point of extrusion and the point of flattening, and which method further comprises:
   (a) extruding as one of said thermoplastics molten crystallizable polyethylene through the center orifice of said die;
   (b) extruding simultaneously with said polyethylene smooth surface-forming polystyrene films through the innermost and outermost orifices of said die;
   (c) intimately contacting both surfaces of said polyethylene film with said polystyrene films without adhering thereto immediately upon egress of said films from said die and simultaneously cooling the composite films while in said contacting relationship;
   (d) maintaining sufficient pressure within said bubble while said composite films are cooling to maintain said composite films in said contacting relationship, and
   (e) thereafter slitting and stripping off the non-adhering smooth surface-forming thermoplastic films from both surfaces of the crystallizable thermoplastic film thereby recovering a clear, crystalline, high-gloss, self-supporting thermoplastic film.

References Cited

UNITED STATES PATENTS

| | | | |
|---|---|---|---|
| 2,848,747 | 8/1958 | Dixon | 264—146 |
| 2,923,194 | 2/1960 | Ambler et al. | 83—176 |

FOREIGN PATENTS

| | | |
|---|---|---|
| 595,567 | 12/1947 | Great Britain. |
| 522,838 | 7/1957 | Italy. |

ROBERT F. WHITE, *Primary Examiner.*

A. R. NOE, *Assistant Examiner.*